(12) United States Patent
Okazaki et al.

(10) Patent No.: US 8,954,431 B2
(45) Date of Patent: Feb. 10, 2015

(54) SMART COLLABORATIVE BRAINSTORMING TOOL

(75) Inventors: Akiko Okazaki, Gero (JP); Joshua Mateo, Medford, NY (US); Edward Werner, Rochester, NY (US); Robert Hendricks, Hilton, NY (US); Alexandra Woodbury, Arlington, VA (US); Tong Sun, Penfield, NY (US); Gregory Cameron, Coeymans Hollow, NY (US)

(73) Assignee: Xerox Corporation, Norwalk, CT (US)

( * ) Notice: Subject to any disclaimer, the term of this patent is extended or adjusted under 35 U.S.C. 154(b) by 628 days.

(21) Appl. No.: 13/156,568

(22) Filed: Jun. 9, 2011

(65) Prior Publication Data

US 2012/0317108 A1 Dec. 13, 2012

(51) Int. Cl.
*G06F 7/00* (2006.01)
*G06F 3/0488* (2013.01)
*G06F 3/0481* (2013.01)
*G10L 15/26* (2006.01)

(52) U.S. Cl.
CPC .......... *G06F 3/0488* (2013.01); *G06F 3/04815* (2013.01); *G10L 15/26* (2013.01)
USPC ........... 707/732; 707/769; 707/803; 715/753; 715/757; 709/204; 709/205

(58) Field of Classification Search
USPC .................. 707/732, 769, 803; 715/753, 757; 709/204, 205
See application file for complete search history.

(56) References Cited

U.S. PATENT DOCUMENTS

| | | | |
|---|---|---|---|
| 7,171,448 B1* | 1/2007 | Danielsen et al. | 709/205 |
| 2003/0080962 A1* | 5/2003 | Erickson et al. | 345/440 |
| 2005/0086230 A1* | 4/2005 | Frees et al. | 707/10 |
| 2005/0114475 A1 | 5/2005 | Chang et al. | |
| 2007/0143398 A1* | 6/2007 | Graham | 709/204 |
| 2009/0119584 A1* | 5/2009 | Herbst | 707/6 |
| 2009/0259937 A1 | 10/2009 | Rohall et al. | |
| 2010/0076959 A1* | 3/2010 | Ramani et al. | 707/722 |
| 2010/0100439 A1* | 4/2010 | Jutla et al. | 707/741 |
| 2012/0062688 A1* | 3/2012 | Shen et al. | 348/14.03 |

OTHER PUBLICATIONS

Mindmeister—online mind mapping and brainstorming, "Brainstorming the easy way", http:www.mindmeister.com/, dated Apr. 25, 2011, 2 pages.

* cited by examiner

*Primary Examiner* — Hosain Alam
*Assistant Examiner* — Jieying Tang
(74) *Attorney, Agent, or Firm* — Fay Sharpe LLP

(57) ABSTRACT

Methods and a system are disclosed for a collaborate brainstorming interface that defines a collaboration session with a three dimensional holographic mind map. An intelligent agent guides a collaboration session that is structured by the interface. The intelligent agent detects key words, work flow steps and user interactions in the session to initiate searches that are filtered using artificial intelligence. The results are presented to developers interacting through the interface.

7 Claims, 6 Drawing Sheets

SMART COLLABORATIVE BRAINSTORMING TOOL

BACKGROUND

The exemplary embodiment relates to fields of collaborative graphical user interfaces. It finds particular application in connection with the provision of a collaborative mind mapping tool with an artificial intelligence engine for evolving a mind map from the collaborative ideas of user developers. However, a more general application can be appreciated with regard to image processing, image classification, image content analysis, image archiving, image database management and searching, and so forth.

Management science, as applicable to all team-oriented environments, has grown from a static environment into a virtual dynamic world of digital meetings with avatars and digital profiles that reflect an employee's desired image. Thus, collaborative efforts, such as at the brainstorming stage of development, can further benefit from digital collaborative tools that provide much needed determinism and less myopic understandings to often chaotic stages of the development process.

Brainstorming is often the first stage of any successful project and the parent stage of most group endeavors in a development process chain. Brainstorming meetings typically include a certain number of participants that collaboratively define an outcome and organize a certain plan of action for achieving the outcome. The outcome itself may be unknown beforehand or a specific outcome may be sought. Regardless of the stage of the project, brainstorming can be an effective tool for determining group direction before moving on to other goal sets. Brainstorming performed effectively among a group can set the stage for a projects success or failure. Considered the most random and chaotic stage among the development process chain, the brainstorming stages can lack the organization, direction and task division present in other stages. Therefore, participation, sharing, and understanding what is being presented is vital to a group dynamic that results in effective brainstorming before a project is fully attempted.

Accordingly, there is a need for digital tools that provide more transparent and intuitive interfaces for providing, navigating and organizing collaborative environments.

BRIEF DESCRIPTION

Methods and apparatus of the present disclosure provide exemplary embodiments for a project definition/brain storming tool that provides a three dimensional, information-centric holographic user interface having an artificial intelligence guiding engine that integrates human intelligence and machine intelligence for creating a mind map. The intelligent engine searches for key words, work flow steps and user interactions to initiate searches, which are filtered using artificial intelligence techniques (e.g., Neural networking, Bayesian networking, Hidden Markov modeling, Kalman filtering, Decision theories, and Utility theories, and the like). The additional data generated by the engine is used in real time to evaluate ideas and automatically suggest potential pathways or courses action to the team of developers.

In one embodiment, a method for collaborate brainstorming executed via a processor of a computer with a memory storing executable instructions is disclosed. A brainstorming session is initiated with a brainstorming topic on a main display with a user interface that interconnects a plurality of developer units. A mind map is created that is based on idea input generated during the brainstorming session. In certain embodiments, creating the mind map includes generating idea images and interconnecting related idea images with idea links based on the idea input received from at least one of the developer units or the main display. The idea input received is dynamically evaluated from the developer units and the main display by filtering input related to the brainstorming topic and retrieving related query terms. These terms are searched in a repository and in at least one network, wherein the searching is initiated automatically according to the input received and/or initiated by at least one of the main display and the developer units from a touch screen input received.

In another embodiment, a user interface system that facilitates collaborative brainstorming among developers is disclosed. The system includes a processor coupled to a memory of a computer device and a main display having a user interface that is configured to display a mind map to a plurality of developer users. The system also includes a remote viewing interface that provides contents of the main display to developers via remote devices and is configured to receive input from the remote devices that is displayed on a screen of the main display. A touch screen interface controls the mind map. The interface includes a three dimensional holographic engine that processes inputs from the touch screen interface and translates the inputs into a three dimensional holographic image extending out of the main display from a two dimensional idea image. The interface further includes an artificial intelligence (AI) engine that filters query terms according to topic relevance received from at least one of voice, audio, text, touch or input/output devices provided as idea input during a brainstorming session among the developers, searches the query terms in a brainstorming project repository and a network and provides searched terms found according to a relevance ranking.

DETAILED DESCRIPTION

Aspects of the exemplary embodiment relate to a system and methods that generate a collaborative development definition with suggestion architecture that intelligently recognizes multiple different inputs and builds connections in real time. A main display is operable to generate a mind map that is presented to each developer unit through a remote viewing interface. The mind map is created collaboratively among the developers and with an artificial intelligence component, which filters key words or key input data and searches out the most relevant data on a project repository and on a network, such as an internet, intranet, LAN, WAN, and the like. The main display is operable to accept and invite developers to participate in a brainstorming/collaborative development meeting and to present idea inputs in the mind map on a surface of the display or in a holographic three dimensional image that extends outward from the device for viewing. In certain embodiments, developers that speak different languages are invited to engage in a brainstorming session and collaborate on ideas for a project. Touch screens from development units are controlled by the developer users to provide input remotely to a central or main display unit that receives the idea inputs. Ideas are provided as input from touch screen, voice, voice-to-text, and external devices, for example. Different languages are interpreted by the main display coupled to a control processor and can be converted to text into a language of choice. These and other exemplary embodiments of this disclosure are further detailed below.

Figure 1:
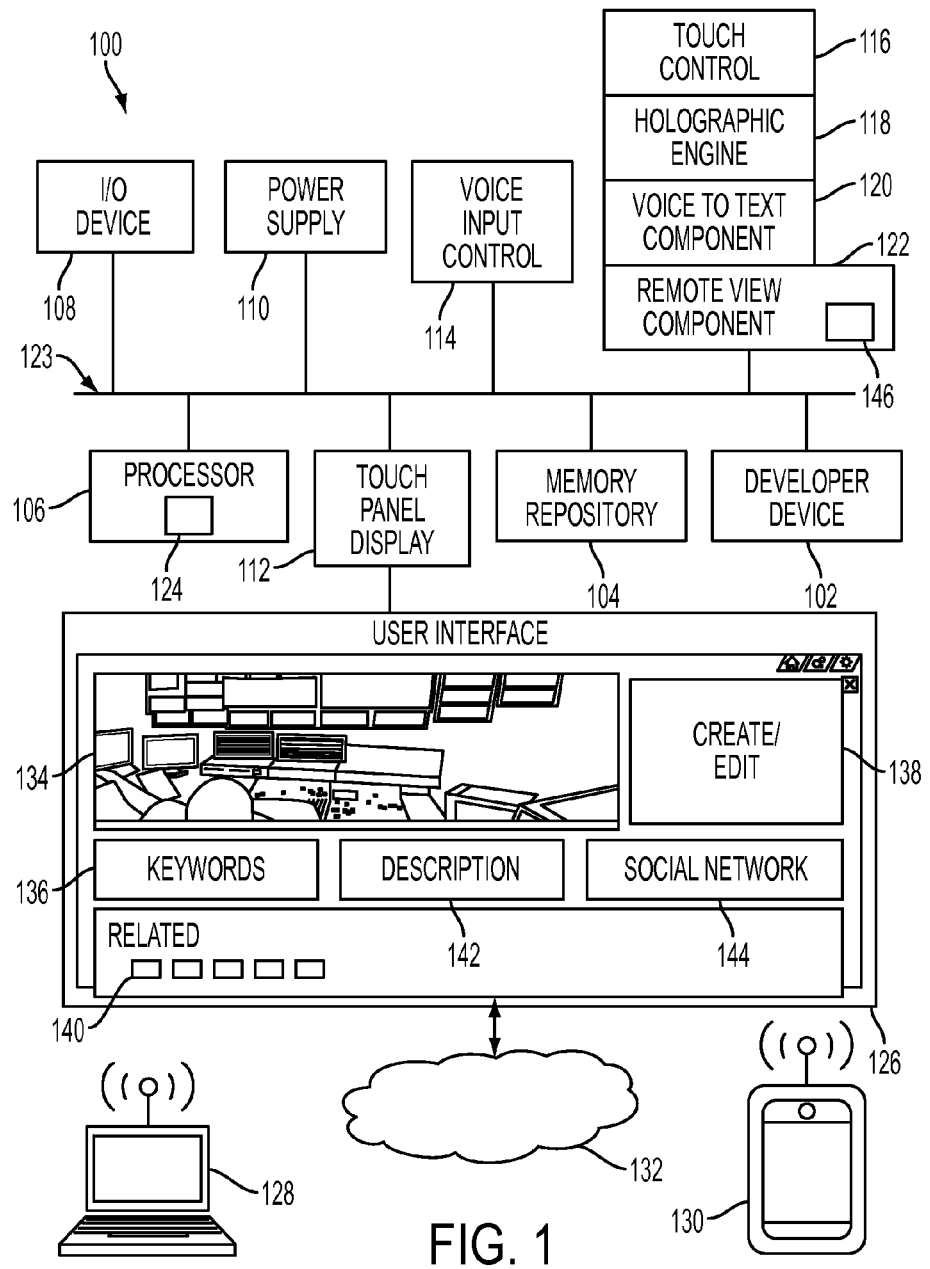
FIG. 1 is a functional block diagram of a user interface system according to exemplary aspects of embodiments herein.

FIG. 1 illustrates one embodiment of an exemplary user interface and control system 100 for facilitating collaborative sessions among multiple developers remotely. A main developer unit device, such as a computer device 102 has a memory 104 for storing instructions that are executed via a processor 106. The system 100 includes at least one input/output device 108, a power supply 110, a touch screen panel display 112 and/or a voice interface/input control 114. The system 100 includes a touch screen control 116 having a holographic engine 118, a voice-to-text component 120 and/or a remote viewing interface component 122. The system 100 and computer device 102 can be configured in a number of other ways and may include additional or different elements. For example, computer device 102 may include one or more output devices, modulators, demodulators, encoders, and/or decoders for processing data.

A bus 123 enables communication among the components of the system 100. The processor 106 includes processing logic that may include a microprocessor or application specific integrated circuit (ASIC), a field programmable gate array (FPGA), or the like. The processor 106 may also include a graphical processor (not shown) for processing instructions, programs or data structures for displaying a graphic, such as a three-dimensional scene or perspective view. An artificial intelligence (AI) agent engine 124 is coupled to the processor that perceives its environment and takes actions that maximize chances of success for enhancing collaborative sessions by filtering idea inputs, searching for most relevant information and providing suggestions. For example, the AI engine 124 retrieves the various different inputs (e.g., voice, video, touch, text, external device and the like) and filters items that are relevant to collaborative engagements occurring among various developers. Based on the results of the search, the relevant items are presented within the user interface 126, which is operatively coupled to the developer device 102 and is viewable through each developer unit at a remote location via wireless or a wired connection.

For example, additional developer units 128, 130 are communicatively linked to the developer device 102 over a network 132. The developer units 128, 130 may be any digital device including a computer, notebook, mobile unit, or the like, for example, that are communicatively connected wirelessly or in a wired connection to the user interface and control system 100. Each developer participating within a collaboration session, such as a brainstorming session, contributes to collaboration through a plurality of developer units, which may comprise any number of units linked to the system 100. The user interface 126 is accessed by the devices on the system and integrated therein in order to view user interface 126. Although, each device may comprise a respective display with interface, the user interface 126 includes at least one graphical user interface (GUI) accessible and remotely viewable by the developer units.

The memory 104 may include a random access memory (RAM) or another type of dynamic storage device that may store information and instructions for execution by the processor 106, a read only memory (ROM) or another type of static storage device that may store static information and instructions for use by processing logic; a flash memory (e.g., an electrically erasable programmable read only memory (EEPROM)) device for storing information and instructions, and/or some other type of magnetic or optical recording medium and its corresponding drive.

The touch screen control 116 accepts touch input from a user that can be converted to signals used by the computer device 102, which may be any processing device, such as a personal computer, a mobile phone, a video game system, or the like. Touch coordinates on the touch panel 124 are communicated to touch screen control 116. Data from touch screen control 116 is passed on to processor 106 for processing to associate the touch coordinates with information displayed on display 112. Where collaborate sessions, such as brainstorming, occur remotely, developer units provide the necessary display and viewable interaction for developers, although multiple developers may be located at the main display 112, in which case the user interface 126 can be projected on to a larger surface area.

Input device 108 may include one or more mechanisms in addition to touch panel 114 that permit a user to input information to the computer device 100, such as microphone, keypad, control buttons, a keyboard, a gesture-based device, an optical character recognition (OCR) based device, a joystick, a virtual keyboard, a speech-to-text engine, a mouse, a pen, voice recognition and/or biometric mechanisms, etc. Input device 108 may also be used to activate and/or deactivate the touch screen interface panel 114.

In one embodiment, the computer device 102 can support the user interface 126 with the holographic engine 118 to enable a developer operating the device to activate a holographic image that extends externally outward from the device. For example, a developer of the main device display 112 signals the touch panel display 112 via an input action, such as by touching an image and pulling it out of the user interface 126, causing the image selected to extend from the display 112 in a holographic image. In certain embodiments, the holographic engine 118 displays a three dimensional hologram of a mind map that can be rotated and viewed from different angles outside of the device 102. As collaborate brainstorming sessions progress in time, various idea inputs are received via the developers and/or the AI agent engine 124, and mapped into an idea map that is presented in a view window 134 of the interface 126. When the holographic image of the mind map is generated, the third dimension (e.g., the z-axis) of the three dimensional holographic mind map can represent different forms of data, such as the progression of time in order to observe the chronological time line of ideas mapped and presented as different graphical images, other perspective views, distinguish among categories or the like.

In certain embodiments, idea inputs are provided to the system 100 in various forms, such as in different languages of the different developers remotely connected thereto, touch screens, text, external devices and the like from various developer units and/or the device 102, which may control via a master control (e.g., the touch control 116) various stages of a collaborative meeting. For example, develop units may be kept from interfacing with the user interface 126 via developer unit controls, allowed complete accessibility or be limited. In particular, each unit 128, 130 and the like may perform brainstorming searches for query terms related to the session at hand. The develop device 102 is controlled to allow result sharing with the touch screen control 116. As ideas and results are generated, each term or data item relevant to the session may be presented in the touch panel display. Searching is also implemented dynamically with the AI agent engine 124.

The AI agent engine 124 dynamically evaluates idea input provided to the developer units 128, 130 and the main touch panel display 112. Ideas generated from the session are retrieved in the form of voice and converted to text with the voice-to-text component 120. Language conversion is enabled by the voice input control 114 to enable foreign associates/clients to participate in the session by converting different language to the chosen collaborative session language. Each touch input at the touch screen, voice recognition controls, text, and the like input is retrieved by the AI engine 124 and filtered for relevant ideas. The terms identified are searched within the memory 104 and among repositories therein for data items created from previous collaborative development projects.

The user interface 126 provides the viewable area 134 where developers can present in real time with a video camera for video conferencing during the session. The interface 126 may be a three dimensional graphical user interface as well as provide a platform for a developer to make and receive calls, send and receive electronic mail, text messages, play various media, such as music files, video files, multi-media files, games, and execute various other applications. Other features may also be provided within the interface 126, such a keywords view 136, a create/edit mind map tool 138, a related project repository 140, a description view 142, a social network or sharing feature 144 and other functions.

The touch screen interface or other input interface receives input signals to direct a developer user to more detailed screens, such as the viewable screen 134 of FIG. 1, which provides keywords and descriptions captured by the AI engine from the topics searched, the project proposal submitted, or other related data, for example. When a new session is initiated with a development collaboration project, the data items for keyword fields and description fields are determined by the AI agent engine 124. These values can be passed to a learning module of the AI agent, which outputs probability scores, or 0-1 values for each field type. For instance, the data items filtered out and their values may be searched for related data items and mapped out: one item can have a 90% likelihood of being first and 10% not first, for example. Therefore, the AI agent engine 134 provides the most optimal matches of data and association between the data to facilitate the brainstorming session idea creation with the greatest amount of accuracy.

In one embodiment, the developer device 102 is operable as a control device for the main display 112 and enables functions to be accessed from remote developer units, such as developer unit 128 and/or 130. The AI engine 124 provides suggestions for guiding/augmenting collaborative sessions. Keywords generated from the AI engine 124 are filtered from the input provided by various developers and searched according to a relevant ranking that is presented at the keywords view 136. Other keywords may be provided based on individual developer searches generated and presented on the display 112. The description of the project may present topic(s) descriptions for the session in the description view 142 and the project may be further shared over social networks 144. Related project information may also be presented in which the AI engine 124 may further search in the repository 104 for mind maps and data created by other development sessions stored.

In one embodiment, the system 100 enables various graphical indicators that can correspond to different developer input, such as colors or image identification for each idea represented as a graphical image within a mind map (not shown). Further, the remote viewing component 122 enables interaction and viewing from among multiple developer units, such as by chat bubbles, voting schemes, video, voice, text, etc.). A voting tool/module 146 enables developers to vote on ideas in creating the mind map, eliminate idea accordingly in response to votes automatically tallied or manipulate ideas according to any other elected purpose.

Figure 2:
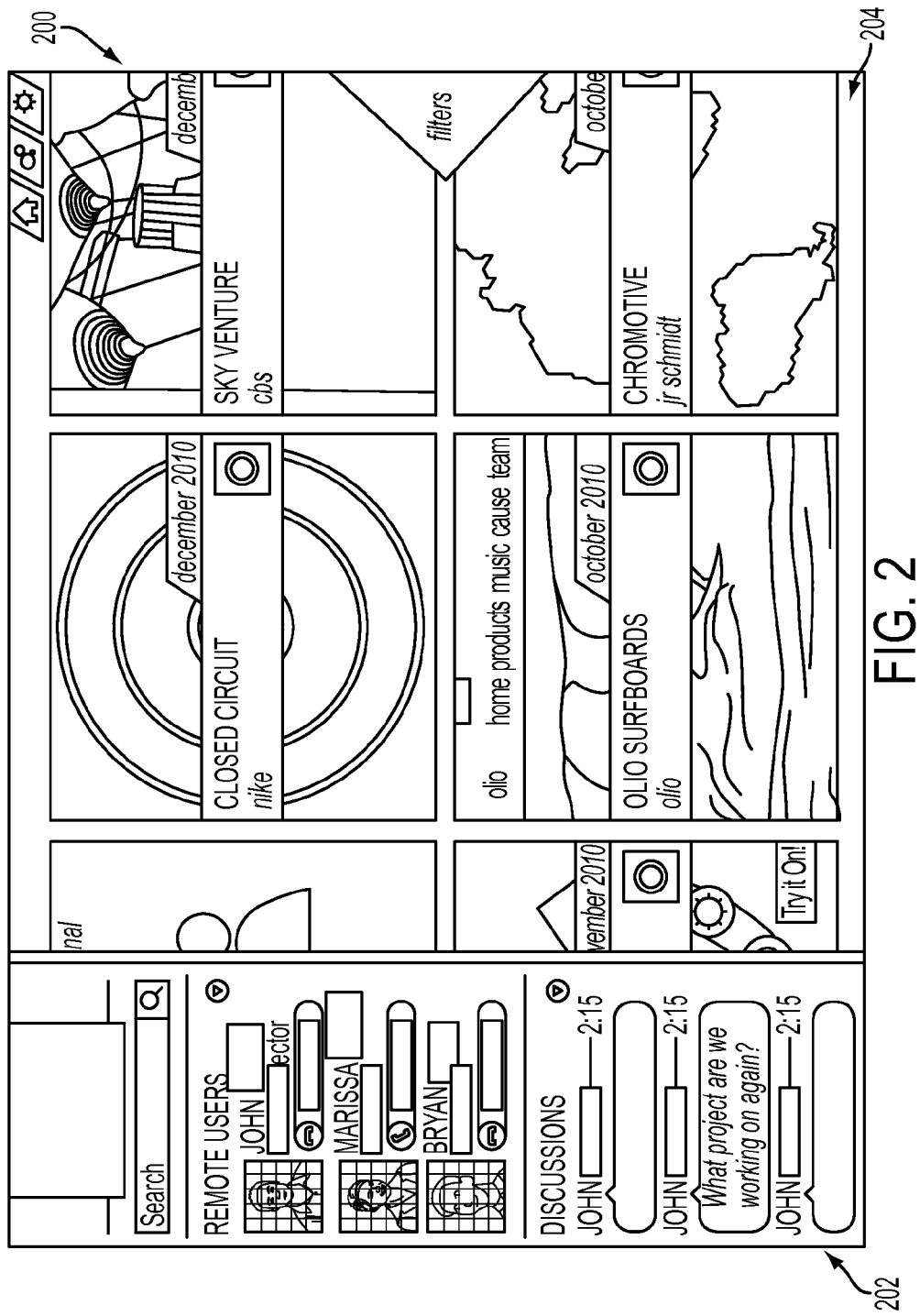
FIG. 2 is a representation of a user interface screen according to exemplary aspects of embodiments herein.

FIG. 2 illustrates an exemplary aspect of a user interface 200, such as a brainstorming collaborative interface for creating a mind map from a brainstorming session that maps idea inputs as they are generated by developers during the collaborative session. The interface 200 is generated in a similar system as the user interface and control system 100 discussed above and will be further described with reference thereto for purpose of explanation. However, other architectures are envisioned for supporting the user interface 200 as a brainstorming or collaborative development tool among multiple developers.

The user interface 200 comprises various different features for collaboration. For example, a communication area 202 provides various ways to chat in bubbles or other interfaces such as by calling, texting, video conferencing and/or the like. In certain embodiments, speech recognition via the voice input control 114 and voice-to-text conversion may be implemented. Multi-language translation may be incorporated within the voice recognition controls and voice-to-text components that are displayed within the communication area 202. Developer users engage with remote users in the communication area 202 of the interface. Users can be invited to collaborative session for specified time periods in which the users are allowed remote or wired connection to the user interface 200. Video may attach each person and only users associated with the specific meeting times may be able to connect thereto. Voice conversations can be converted into text script in which key words associated to a high degree of relevance to the topic through keywords and/or topic description may be augmented by the AI agent engine. Speech commands may be provided to capture the concepts and associations between the ideas within a mind map. An advantage is provided to the collaborative session by improving remote user engagement and efficiency is increased in the organization and development of the brainstorming process.

A repository of projects is illustrated in a home screen section 204, for example. An artificial intelligence agent powered by the AI engine 124 filters past projects that relate or are relevant to the present brainstorming session. Projects and data relevant to the topic of the present session may be presented by the AI engine 124 in the home screen section, in which tools and templates from other development projects may be linked. Projects may also be initiated from without fixed resources and tools for the particular session where the resources and tools for use may be integrated according to group preferences. For example, the chat section 202 is able to be activated for the particular project. Other features discussed above may be summoned and integrated into the development project interface according to developer preference. When a project is created a name (project title), a client, date, and mind-map icon are assigned, for example, and prepopulated to initiate the collaborative/brainstorming session. Uploaded projects documents may be automatically indexed and stored in the project repository for the initiated session.

Figure 3:
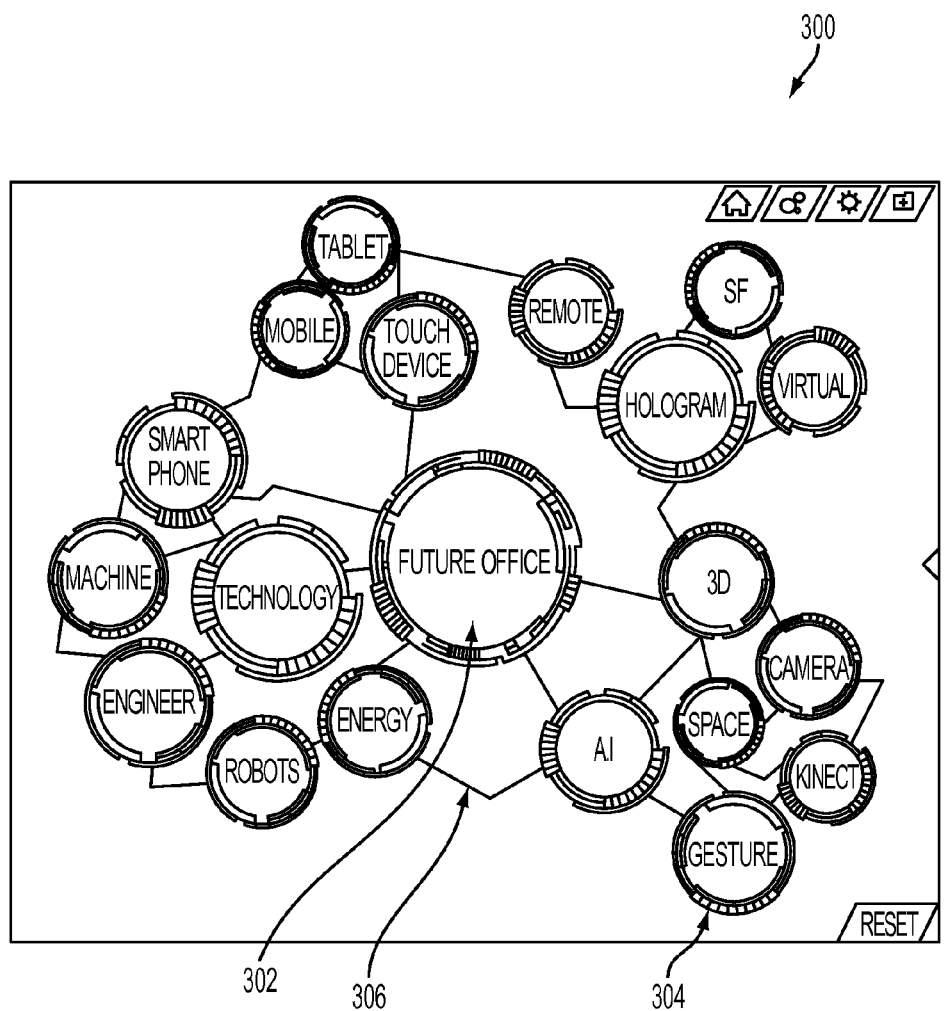
FIG. 3 is a representation of a user interface screen according to embodiments herein.

Referring now to FIG. 3, illustrated is an aspect of an exemplary mind map 300 created from a collaborative session and stored in a repository database or other memory storage module. A center idea graphic 302 is illustrated within the mind map 300 that represents a central topic. For example, the topic of the brainstorming session is provided within the graphic image (e.g., "Future Office"). Each idea or concept is represented by a graphic image, such as a bubble or other idea graphic. Other graphical images may also be utilized and personalized as one of ordinary skill in the art will appreciate and no one shape, location or size of the idea graphic 302 is limiting herein. The mind map 300 further includes other idea graphics 304 represented by different bubbles of different size. The size may correspond to a degree of relevance as determined by the AI engine of the system or manually determined, for example. Each graphic image may have different keywords that have been extracted and tagged to the concept represented by a respective graphical image. Links between the different graphical images 306 illustrate associations, derivations and relevance to ideas within the map. A new bubble or image graphic representing a concept from the collaborative session may designate developers associated with idea in one example, and in other examples the image is blank without any representation for the idea or the developer.

A new graphic image may be created by an input, such as touch, voice, text, external device input or the like. In the touch screen interface, a tap to the surface of the touch screen display generates an idea graphic with a blank field that can have words added or be suggested by initiated the AI engine from an AI control feature (not shown) associated therewith. Alternatively, with each word, concept or idea provided to the system, the AI engine scans the input and automatically launches a search query over a network to collected related contents from the network to provide the results in a suggest side-bar or other graphical user interface (GUI) features. While the searches and suggestions may be initiated manually or performed automatically, each develop unit may perform independent searching for related ideas and description in order to supplement the developer's own knowledge store and the database of the device. Each individual search may be presented on the main display 112 discussed above and made available to all users via the user interface 126. In certain embodiments, the searching performed manually and independently may be fused with other search results in order to provide a complete repository of data generated within the brainstorming session.

Information suggested by the AI engine can be selected by users and linked to other parts of the mind map that share common relationships, such as the link 306 and other associative links illustrated. The text fields may be editable or rearranged as well as the idea graphics. Further searches may be performed automatically and simultaneously for different query terms, which may be shared remotely among developers along with associated rankings of relevance provided by the AI engine 124, for example. The ranking of keyword or terms generated from the searching may be re-ranked manually by the developers. The searches can be merged where multiple developer users compose a set of query terms for search and also each result or searched term may be automatically or manually re-ranked based on the merged set of terms. This integration is advantageous because multiple users are able to collaboratively search and discover new concepts/ ideas/ relationships and augment the brainstorming process with a more engaging experience.

In one embodiment, developers are able to vote for ideas to be extended or cancelled. For example, developer teams formed within a collaborative session to discuss ideas. Teams may then further collaborate with the present system disclosed herein to discuss further and vote on the ideas. Developers are able to submit comments, ideas, further enhance and discuss suggestions provided about each idea.

Figure 4A:
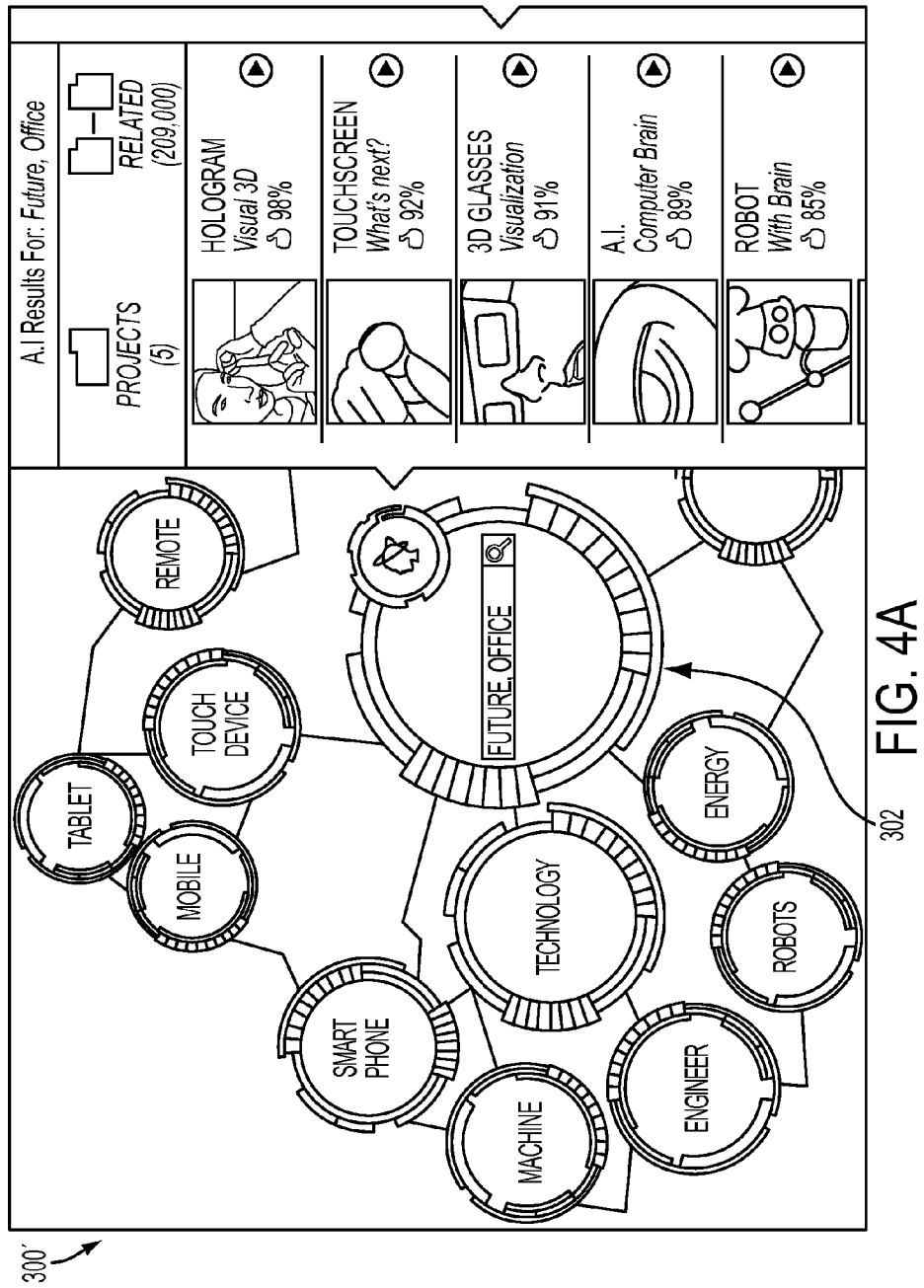
FIGS. 4a and 4b are a representation of a user interface screen according to aspects of exemplary embodiments herein.
Figure 4B:
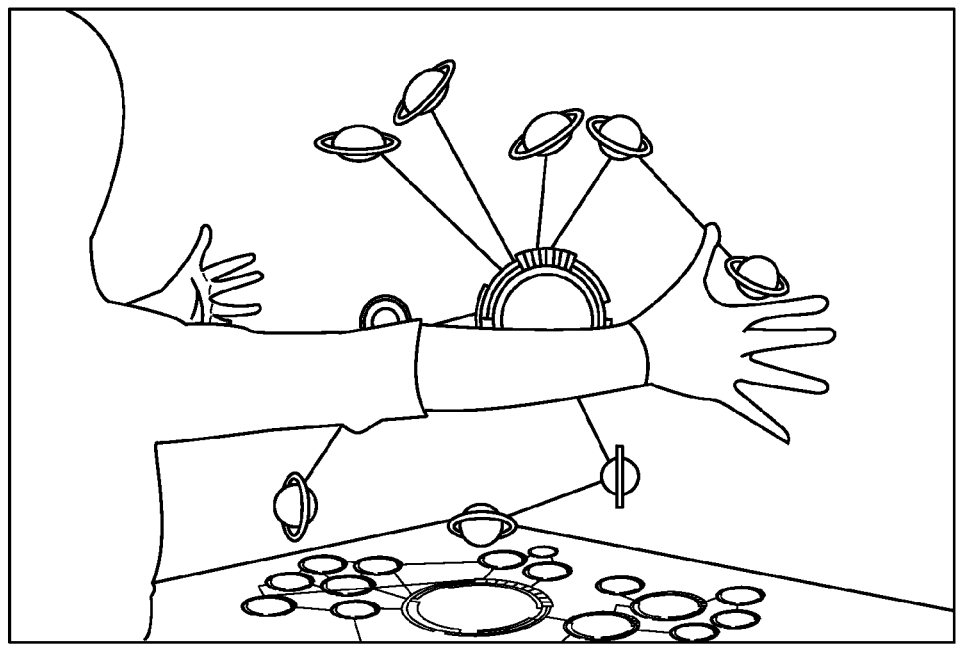

FIGS. 4a and 4b illustrate representations of the user interface screen with a mind maps having graphical idea images and associations therebetween. FIG. 4a illustrates various suggestions provided by the AI agent engine 124 that correspond to a concept represented by a graphic image 302' within a mind map 300'. Graphical elements located outside and around the graphic idea image 302' represents a hierarchical data set that can be navigated into. FIG. 4b illustrates the mind map 300' of FIG. 4a as a three dimensional holographic image extending from the user interface outward. The three dimensional holographic mind map is generated by a holographic engine upon receiving inputs at a touch screen for example, such as by a motion that simulates pulling the image out of the screen. For instance, placing a hand on the image, clasping the image with the hand and drawing the hand clasped away from the screen.

Various methodologies in accordance with the subject disclosure will now be described via a series of acts, which is to be understood and appreciated that the present disclosure is not limited by the order of acts, as some acts may occur in different orders and/or concurrently with other acts from that shown and described herein. For example, those skilled in the art will understand and appreciate that these methodologies herein could alternatively be represented as a series of interrelated states or events, such as in a state diagram. Moreover, not all illustrated acts may be required to implement a methodology in accordance with the present disclosure.

Figure 5:
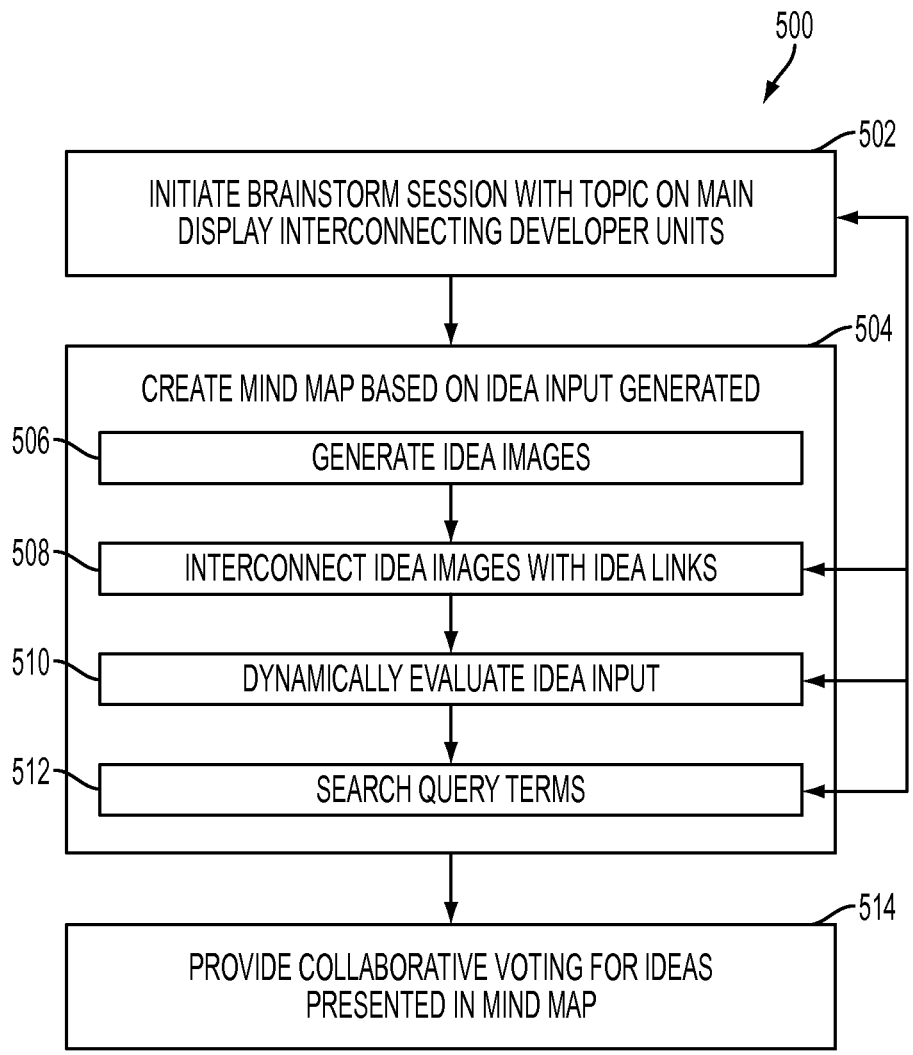
FIG. 5 is a flowchart detailing a method for a collaborative session according to exemplary aspects of embodiments herein.

FIG. 5 illustrates an exemplary method 500 for a collaborate brainstorming executed via a processor of a computer with a memory having instructions for execution. Embodiments of the method are described here with examples referenced to FIG. 1. At 502, a brainstorming session initiates with a related topic at a main display 112 having a user interface 126 that interconnects a plurality of developer units 128, 130. The user interface provides structure for collaborating sessions, such as brainstorming for development. The user interfaces provides keywords, descriptions, social networking, related projects and repositories therewith, as well as communication links interconnecting developers for interaction via the various developer units.

At 504, one or more mind maps are created dynamically according to input into a main developer device 102 through the user interface 112 and from all developer unit devices 102, 128, and 130. As idea input is received by the user interface system, idea graphic images are generated according to the various inputs. For example, a touch screen interface panel 112 may receive input to create a new idea graphic from any one of the developer units, and/or a three dimensional holographic request may be received to generate a three dimensional holographic view of an image. Each idea graphic provides for a different idea that may be labeled accordingly by keyword text or other fashion. In certain embodiments, the holographic view presents an extended view that is rotatable around an axis in order to provide additional information to the developers, such as a session chronology or development stages with respect to time. Other inputs for ideas are also envisioned, such as voice input provided over a microphone or conference session orchestrated through the user interface. Video input may also be provided as well as text and voice-to-text input. Each input is searched by an artificial intelligence engine 124 as idea input to further provide suggestions and build the mind map generated.

The mind map created at 504 interconnects the idea image graphics with idea links at 508 represented by line segments within the mind map, for example. These interconnections represent relations among the idea graphics and each idea image may have one or more multiple connections to other ideas. At 510, the artificial intelligence engine 124 dynamically evaluates each idea input received by the system 100. For example, touch input, voice, text, or the like are filtering the inputs received for relation to the topic of the session and relationships among ideas provided on the mind map. Related terms are queried at 512 for similar terms in a repository of previous collaboration sessions and/or on a network, such as an internet or intranet. The related term search may be initiated automatically or initiated manually by any one of the developers and respective developer units. The artificial intelligence engine therefore provides suggestions for ideas, keyword, and description for further study in order to further facilitate effective brainstorming among developers and creation of the mind map. Terms may also be provided a relevance score based on each idea image or on the overall topic, for example.

At 514, a voting tool is provided within the user interface for allowing group and/or sub-group collaboration and voting capabilities on ideas and directions for research. One or more graphic image idea or input ideas received can be cancelled or kept depending upon the voting received. The tool may be in the form of a tally total or score provided within the interface, for example.

The method(s) illustrated may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in the figures, can be used to implement the method for displacing and/or manipulating virtual objects.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for collaborate brainstorming executed via a processor of a computer with a memory storing executable instructions for the method, comprising:
   initiating a brainstorming session with a brainstorming topic on a main display with a user interface that interconnects a plurality of developer units;
   creating a mind map based on idea inputs generated in a duration of the brainstorming session including:
      in the main display and developer unit displays, generating idea images and interconnect related idea images with idea links based on the idea inputs received from at least one of the developer units or the main display wherein the idea images are visually sized to represent a degree of relevance to the brainstorming topic determined by a processing engine of the computer;
      dynamically evaluating the idea inputs received from the developer units and the main display by filtering input related to the brainstorming topic and retrieving related query terms;
      searching for related query terms in a repository and in at least one network, wherein the searching is initiated automatically according to the input received and/or initiated by at least one of the main display and the developer units from a touch screen input received;
      suggesting query terms within a search display in at least one of the main display and one or more of the developer unit displays based on the evaluating and the searching;
      ranking the query terms suggested based on a relevance ranking within the mind map;
      importing data stored in the repository and the network based on the brainstorming session initiated;
      providing concepts suggested from at least one developer unit or the main display to respective displays of the developer units based on at least one control input received at the main display;
      providing a visual re-ranking automatically of the suggested concepts based on a vote received by the developers via the developer units and the main display; and
      adding/cancelling idea images from votes received at the main display, wherein the re-ranking and the visually-sized idea images are commonly displayed on a user interface screen.

2. The method of claim 1, further comprising:
   fusing search results from searches conducted on more than one of the main display and the developer units.

3. The method of claim 1, further comprising:
   providing video and/or voice data through the units and the main display from developers participating in the brainstorming session via the display and the developer units.

4. The method of claim 1, wherein the idea input includes a voice input received that is processed by the processor with a speech recognition engine configured to recognize speech terms in a plurality of different languages, a touch screen interface input received from a touch screen surface of the main display and/or the developer units, and/or an input signal received from an input device.

5. The method of claim 4, further comprising:
   converting speech to text and extracting the related terms from speech into idea images and/or idea image links representing associations therebetween into the mind map displayed.

6. The method of claim 1, wherein the user interface interconnects the developer units by providing visual data, textual data, audio data and user interface input from developers concurrently through the plurality of developer units.

7. The method of claim 1, further comprising:
   providing invitation and authorization to developers to engage the brainstorming session remotely through the developer units within a predetermined time period.

* * * * *